(12) United States Patent
Uchigaito

(10) Patent No.: US 11,715,036 B2
(45) Date of Patent: Aug. 1, 2023

(54) UPDATING WEIGHT VALUES IN A MACHINE LEARNING SYSTEM

(71) Applicant: Hitachi, Ltd., Tokyo (JP)

(72) Inventor: Hiroshi Uchigaito, Tokyo (JP)

(73) Assignee: HITACHI, LTD., Tokyo (JP)

( * ) Notice: Subject to any disclaimer, the term of this patent is extended or adjusted under 35 U.S.C. 154(b) by 504 days.

(21) Appl. No.: 16/913,082

(22) Filed: Jun. 26, 2020

(65) Prior Publication Data
US 2021/0012231 A1 Jan. 14, 2021

(30) Foreign Application Priority Data
Jul. 9, 2019 (JP) .............................. JP2019-127431

(51) Int. Cl.
| | | |
|---|---|---|
| *G06N 20/00* | (2019.01) | |
| *G06N 7/00* | (2023.01) | |
| *G06N 3/08* | (2023.01) | |
| *G06N 3/047* | (2023.01) | |
| *G06N 10/00* | (2022.01) | |
| *G06N 3/044* | (2023.01) | |

(52) U.S. Cl.
CPC .............. *G06N 20/00* (2019.01); *G06N 3/047* (2023.01); *G06N 3/08* (2013.01); *G06N 7/00* (2013.01); *G06N 10/00* (2019.01); *G06N 3/044* (2023.01)

(58) Field of Classification Search
CPC ............ G06N 20/00; G06N 7/00; G06N 3/08; G06N 3/0472; G06N 3/0445; G06N 10/00
See application file for complete search history.

(56) References Cited

U.S. PATENT DOCUMENTS 10,325,218 B1 * 6/2019 Zeng ...................... G06N 10/00
10,510,003 B1 * 12/2019 Olabiyi ................ G06N 3/0472
(Continued)

FOREIGN PATENT DOCUMENTS

| JP | 2017-507439 A | 3/2017 |
|---|---|---|
| JP | 2018-67200 A | 4/2018 |

OTHER PUBLICATIONS

Pan et al., "Reinforcement Learning with Dynamic Boltzmann Softmax Updates" Mar. 15, 2019, arXiv: 1903.05926v2, pp. 1-23. (Year : 2019).*

(Continued)

*Primary Examiner* — Miranda M Huang
*Assistant Examiner* — Chase P. Hinckley
(74) *Attorney, Agent, or Firm* — Mattingly & Malur, PC

(57) ABSTRACT

A machine learning system includes a learning section and an operating section including a memory. The operating section holds a required accuracy, and an internal state and a weight value of a learner in the memory and executes calculation processing by using data input to the machine learning system and the weight value held in the memory to update the internal state. An accuracy of the internal state is calculated from a result of the calculation processing and an evaluation value is calculated using the data input to the machine learning system, the weight value, and the updated internal state held in the memory when the calculated accuracy is higher than the required accuracy. The evaluation value is transmitted to the learning section, which updates the weight value by using the evaluation value and notifies the number of times of updating the weight value to the operating section.

9 Claims, 17 Drawing Sheets

(56) References Cited

U.S. PATENT DOCUMENTS

| | | | | |
|---|---|---|---|---|
| 10,896,382 | B2* | 1/2021 | Uchibe | G06N 7/005 |
| 10,896,383 | B2* | 1/2021 | Uchibe | G06N 7/005 |
| 10,977,558 | B2* | 4/2021 | Herbster | G06N 3/0472 |
| 11,288,568 | B2* | 3/2022 | Gu | G06N 3/0427 |
| 11,455,513 | B2* | 9/2022 | Harry Putra | G06N 3/0472 |
| 2003/0036903 | A1* | 2/2003 | Konopka | G10L 15/065 |
| | | | | 704/E15.009 |
| 2016/0328659 | A1 | 11/2016 | Mohseni et al. | |
| 2017/0255871 | A1* | 9/2017 | Macready | G06N 7/01 |
| 2017/0364362 | A1* | 12/2017 | Lidar | G06F 9/3861 |
| 2018/0046902 | A1* | 2/2018 | Liao | G06N 3/0472 |
| 2018/0165601 | A1* | 6/2018 | Wiebe | G06F 17/11 |
| 2018/0197083 | A1* | 7/2018 | Dasgupta | G06N 3/0445 |
| 2018/0218242 | A1* | 8/2018 | Sekine | G06K 9/6274 |
| 2019/0086876 | A1* | 3/2019 | Sasaki | G06N 20/00 |
| 2019/0087751 | A1* | 3/2019 | Sasaki | G06N 3/006 |
| 2019/0130278 | A1* | 5/2019 | Karras | G06N 3/0472 |
| 2019/0156197 | A1* | 5/2019 | Dasgupta | G06N 3/0454 |
| 2019/0235033 | A1* | 8/2019 | Ohzeki | G16Z 99/00 |
| 2019/0279028 | A1* | 9/2019 | Wang | G06N 3/0454 |
| 2019/0377982 | A1* | 12/2019 | Ando | G06N 20/00 |
| 2019/0385061 | A1* | 12/2019 | Chaudhury | G06N 7/005 |
| 2020/0104715 | A1* | 4/2020 | Denolf | G06N 3/006 |
| 2020/0134502 | A1* | 4/2020 | Anschuetz | G06N 10/00 |
| 2020/0193333 | A1* | 6/2020 | Iwane | G06N 20/00 |
| 2020/0210884 | A1* | 7/2020 | Hadash | G06N 3/088 |
| 2020/0233384 | A1* | 7/2020 | Iwane | G06N 3/006 |
| 2020/0234123 | A1* | 7/2020 | Shigezumi | G05B 13/0265 |
| 2020/0250512 | A1* | 8/2020 | Harry Putra | G06N 3/0454 |
| 2020/0279185 | A1* | 9/2020 | Wiebe | G06F 17/18 |
| 2020/0285204 | A1* | 9/2020 | Iwane | H02J 3/381 |
| 2020/0302323 | A1* | 9/2020 | Macglashan | G06N 3/006 |
| 2020/0302339 | A1* | 9/2020 | Nadamuni Raghavan | |
| | | | | G06N 3/0409 |
| 2020/0311546 | A1* | 10/2020 | Lee | G06N 3/08 |
| 2020/0401916 | A1* | 12/2020 | Rolfe | G06N 10/60 |
| 2021/0011748 | A1* | 1/2021 | Lee | G06F 17/16 |
| 2021/0081804 | A1* | 3/2021 | Stojevic | G16B 40/30 |
| 2021/0295193 | A1* | 9/2021 | Harrison | G06N 20/00 |
| 2021/0398621 | A1* | 12/2021 | Stojevic | G16C 10/00 |
| 2022/0052925 | A1* | 2/2022 | Vandikas | G06N 3/04 |

OTHER PUBLICATIONS

Wang et al., "HAQ: Hardware-Aware Automated Quantization" Dec. 6, 2018, arXiv: 1811.08886v2, pp. 1-11. (Year: 2018).*
Yoshioka et al., "Transforming generalized Ising models into Boltzmann machines" Mar. 8, 2019, pp. 1-11. (Year: 2019).*
Cesa-Bianchi et al., "Boltzmann Exploration Done Right" Nov. 7, 2017, arXiv: 1705.10257v2, pp. 1-15. (Year: 2017).*
Gupta et al., "Almost Boltzmann Exploration" Apr. 19, 2019, arXiv: 1901.08708v2, pp. 1-12. (Year: 2019).*
Graves "Neural Turning Machines" Dec. 10, 2014, arXiv: 1410.5401v2, pp. 1-26. (Year: 2014).*
Asadi et Littman, "An Alternative Softmax Operator for Reinforcement Learning" Jun. 14, 2017, arXiv:1612.05628v5, pp. 1-10. (Year: 2017).*
Levit et al., (Anon.) "Reinforcement Learning via Replica Stacking of Quantum Measurements for the Training of Quantum Boltzmann Machines" Feb. 15, 2018, pp. 1-15. (Year: 2018).*
Raghavan et al., "Generative Memory for Lifelong Reinforcement Learning" Feb. 22, 2019, arXiv: 1902.08349v1, pp. 1-3. (Year: 2019).*
Hsu et al., "MONAS: Multi-Objective Neural Architecture Search" Dec. 3, 2018, arXiv: 1806.10332v2, pp. 1-8. (Year: 2018).*
Osogami, Takayuki, "Boltzmann machines for time-series" Jan. 18, 2019, arXiv: 1708.06004v3, pp. 1-33. (Year: 2019).*
Sugiyama et al., "Transductive Boltzmann Machines" May 21, 2018, arXiv: 1805.07938v1, pp. 1-10. (Year: 2018).*
Vahdat et al., "DVAE#: Discrete Variational Autoencoders with Relaxed Boltzmann Priors" Oct. 15, 2018, arXiv: 1805.07445v4, pp. 1-11. (Year: 2018).*
Crawford et al., "Reinforcement Learning using Quantum Boltzmann Machines" Jan. 3, 2019, arXiv: 1612.05695v3, pp. 1-25. (Year: 2019).*
Eysenbach et al., "Search on the Replay Buffer: Bridging Planning and Reinforcement Learning" Jun. 12, 2019, arXiv: 1906.05253v1, pp. 1-16. (Year: 2019).*
Kozuno et al., "Theoretical Analysis of Efficiency and Robustness of Softmax and Gap-Increasing Operators in Reinforcement Learning" Apr. 11, 2019, pp. 1-9. (Year: 2019).*
Harrison et al., "Continuous Restricted Boltzmann Machines" Aug. 30, 2018, U.S. Appl. No. 62/724,655, pp. 1-29. (Year: 2018).*
Pilati et al., "Self-learning projective quantum Monte Carlo simulations guided by restricted Boltzmann machines" Jul. 1, 2019, arXiv: 1907.00907v1, pp. 1-12. (Year: 2019).*
Inack et al., "Projective quantum Monte Carlo simulations guided by unrestricted neural network states" 2018, pp. 1-9. (Year: 2019).*

* cited by examiner

VISIBLE SPIN 1    HIDDEN SPIN    VISIBLE SPIN 2

SPIN    WEIGHT

FIG. 7A

INITIAL SETTING 1

| PARAMETER | VALUE |
|---|---|
| LEARNING COEFFICIENT | 0.01 |
| NUMBER OF UNITS | 128 |
| NUMBER OF LAYERS | 4 |
| OPTIMIZATION METHOD | ADAM |
| MAXIMUM VALUE OF LEARNING STEP | 50000 |
| LEARNING COMPLETION CONDITION | 195.0 OR MORE |
| ... | ... |

FIG. 7B

INITIAL SETTING 2

| PARAMETER | VALUE |
|---|---|
| REQUIRED ACCURACY | 0.95 |
| NUMBER OF TIMES OF INITIAL CALCULATION | 10 |
| NUMBER OF TIMES OF ADDITIONAL CALCULATION | 1 |
| MAXIMUM NUMBER OF TIMES OF CALCULATION | 10000 |
| ... | ... |

FIG. 10

| 1001 | | | |
|---|---|---|---|
| 60 | 3 | 41 | ... |
| 3 | 21 | 91 | ... |
| 101 | 0 | 58 | ... |
| ⋮ | ⋮ | ⋮ | ⋮ |

↓

| 1002 | | | |
|---|---|---|---|
| 0101001... | 1101100... | 0100010.. | ... |
| 0101100... | 0010110... | 1100110... | ... |
| 1000110... | 1011000... | 0001100... | ... |
| ⋮ | ⋮ | ⋮ | ⋮ |

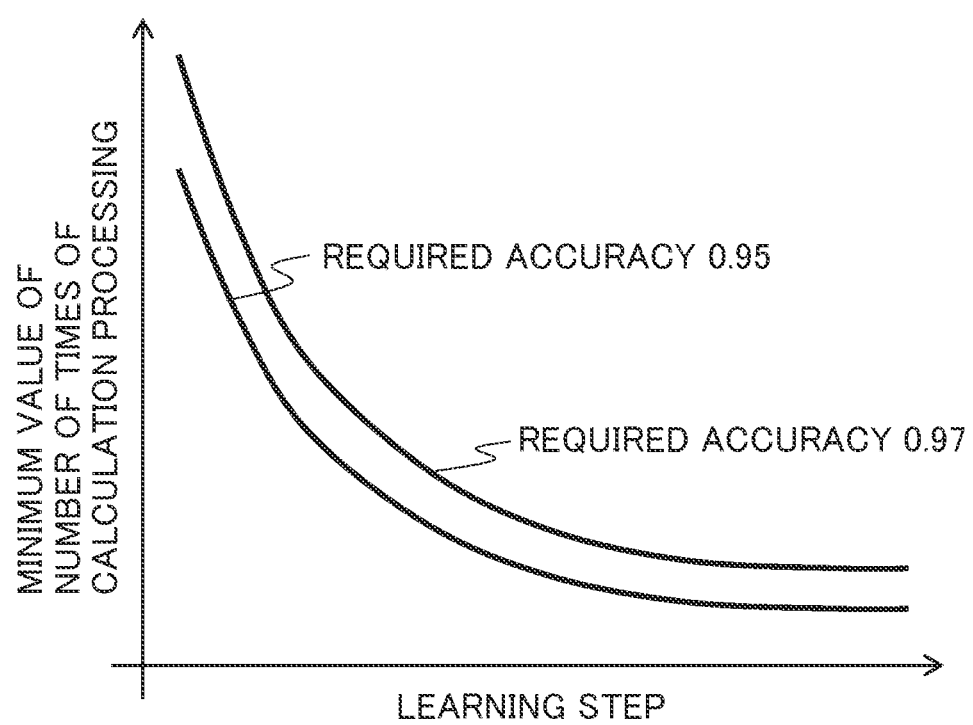

UPDATING WEIGHT VALUES IN A MACHINE LEARNING SYSTEM

CROSS-REFERENCE TO RELATED APPLICATION

The present application claims priority from Japanese application JP 2019-127431, filed on Jul. 9, 2019, the contents of which is hereby incorporated by reference into this application.

BACKGROUND

The present invention relates to a machine learning system which realizes power saving and speeding-up of learning and inference processing in machine learning.

With the development of a machine learning algorithm typified by deep learning or the like, the accuracy of recognition of images and voices or the like by a computer has recently been improved. With its improvement, applications of machine learning such as automatic driving, machine translation, etc. have been rapidly expanding.

One of problems at the time of applying the machine learning to a complex problem resides in that the number of times of updating weights necessary until completion of learning is increased. The term weights are equivalent to, for example, connection coefficients between neurons in a neural network. When the number of times of their updating increases, the number of times of operation increases in proportion thereto and hence a learning time is increased. Therefore, studies on algorithms capable learning even though the number of times of updating the weights is reduced have recently become active. Machine learning using the Boltzmann machine is also one of them. It has been known that there is a case in which when the Boltzmann machine is used, the number of times of updating the weights necessary for the learning can be reduced as compared with the case in which the neural network is utilized. It is thus possible to perform learning in a short period of time even in the case of the complex problem.

There has been disclosed in Japanese Unexamined Patent Application Publication No. 2018-67200, a technique related to a physical simulation using a quantum effect. There has been disclosed in Japanese Unexamined Patent Application Publication (Translation of PCT application) No. 2017-507439, a hardware and programming technique for realizing quantum annealing.

SUMMARY

As mentioned in the description of the background, the machine learning using the Boltzmann machine is capable of reducing the number of times of updating the weights as compared with the machine learning using the neural network. However, the number of times of product-sum operation necessary for updating the weights once increases as compared with when using the neural network. There has therefore been a demand for a technique of reducing the number of times of product-sum operation necessary to update the weights.

There has been described in Japanese Unexamined Patent Application Publication No. 2018-67200, a technique of solving a negative sign problem while avoiding a temporary phase transition when calculating a physical quantity of a system (including the Boltzmann machine and the ising model) comprised of a plurality of spins capable of taking two values. Thus, even in a system in which the physical quantity has not been calculated so far due to the negative sign problem, the physical quantity can be determined, and the physical quantity can be calculated at high speed by using the quantum effect. However, when the technique is applied to learning, the number of times of product-sum operation necessary to update the weights cannot be reduced.

Further, there has been described in Japanese Unexamined Patent Application Publication (Translation of PCT application) No. 2017-507439, a technique related to hardware mounted with a system (including the Boltzmann machine and the ising model) comprised of a plurality of quantum spins. Thus, a ground state search for a quantum spin system can be executed at high speed, but when the technique is applied to learning, the number of times of product-sum operation necessary to update the weights cannot be reduced.

An object of the present invention is to provide a technique capable of, when the Boltzmann machine is used for machine learning, reducing the number of times of product-sum operation necessary to update weights and shortening a learning time.

One aspect of a machine learning system, which solves the above object is a machine learning system having a learning section and an operating section including a memory. The operating section holds a required accuracy, and an internal state and a weight value of a learner in the memory, executes calculation processing by using input data input to the machine learning system and the weight value held in the memory to thereby update the internal state held in the memory, calculates an accuracy of the internal state from a result of the calculation processing, calculates an evaluation value by using the input data input to the machine learning system, the weight value held in the memory, and the updated internal state held in the memory when the calculated accuracy is higher than the required accuracy, and transmits the evaluation value to the learning section. The learning section updates the weight value held in the memory by using the evaluation value and notifies the number of times of updating the weight value to the operating section.

With the use of the present invention, power saving and speeding-up of learning and inference processing in machine learning can be implemented. For example, learning and inference processing at an edge stringent in the restriction of power and a circuit scale become possible.

BRIEF DESCRIPTION OF THE DRAWINGS

FIGS. 7A and 7B are tables showing setting values at an initial setting, in which FIG. 7A shows an example of the setting values, and FIG. 7B shows another example of the setting values;

FIG. 10 is an explanatory diagram showing an example of conversion of image data to be input to the operating section;

FIG. 17 is a graph showing an example of the difference in relationship between the number of learning steps and the minimum value of the number of times of repletion of operation which satisfies a required accuracy, at different required accuracies.

DETAILED DESCRIPTION

Embodiments

Preferred embodiments of a machine learning system showing the present invention will hereinafter be described.

Figure 1:
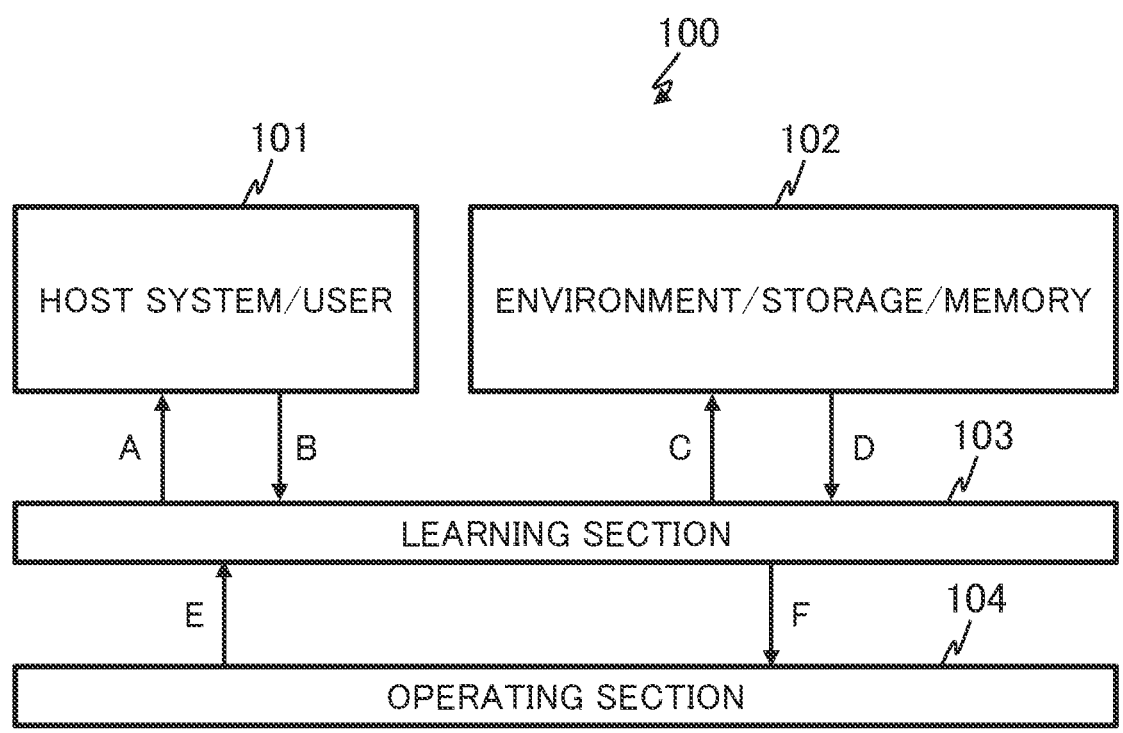
FIG. 1 is a configuration diagram showing an embodiment of a machine learning system.
Figure 2:
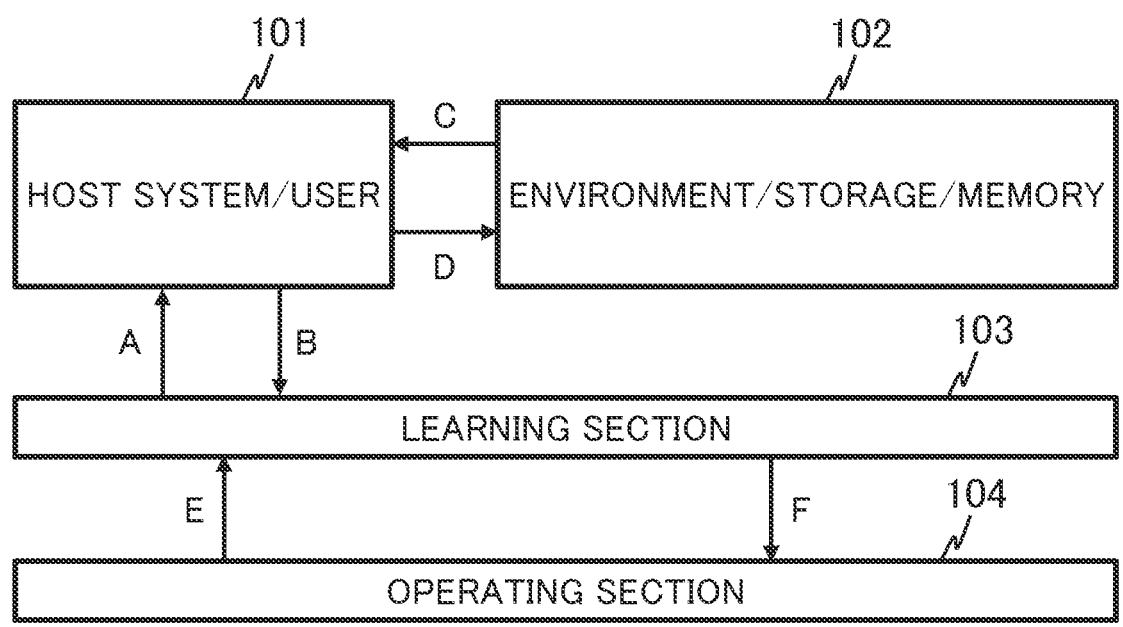
FIG. 2 is a configuration diagram showing an example of another configuration of the embodiment of the machine learning system.

A configuration of the machine learning system is shown in FIGS. 1 and 2. The machine learning system 100 is comprised of an upper system (host system) which generalizes machine learning and a user which gives an instruction for the machine learning 101, an environment of supplying data used for learning, a storage storing the data used for learning, and a memory 102, a learning section 103 which executes learning, and an operating section 104 which executes operation necessary for learning. Even only either one of the host system and the user may be connected to the learning section 103, or the learning section 103 may be connected to both thereof.

Further, as shown in FIG. 1, only either one of the environment, storage, and memory 102 may be connected to the learning section 103 or two or more thereof may be connected thereto. Alternatively, as shown in FIG. 2, the environment, storage, and memory 102 may be connected to the host system or the user 101 other than the learning section 103. In that case, the data used for learning is transmitted to the learning section 103 through the host system or the user 101.

An example of the host system 101 includes an operating system which executes the learning section 103, a container typified by a virtual machine, a Docker or the like, software which manages them, and hardware mounted with them, or the like. In that case, an example of the learning section 103 includes a machine learning framework such as TensorFlow, Keras, Caffe, PyTorch, Chainer, or the like. An example of the operating section 104 includes a neural network having a weight value, dedicated hardware (ASIC and FPGA) mounted with the operation of a Boltzmann machine, software having described their operations, and general-purpose hardware such as a CPU, a GPU or the like.

Also, another example thereof includes a case where the host system corresponds to the machine learning framework such as TensorFlow, Keras, Caffe, PyTorch, Chainer or the like. In that case, the learning section 103 and the operating section 104 correspond to software of executing lower-layer learning and operation, hardware, or their combination. Arrows described in FIGS. 1 and 2 respectively indicate the flow of data and commands. The details of the data and commands corresponding to the respective arrows will be described later. In the present specification, a set of data to be processed by the learning section 103 and the operating section 104 is called a leaner.

Figure 3:
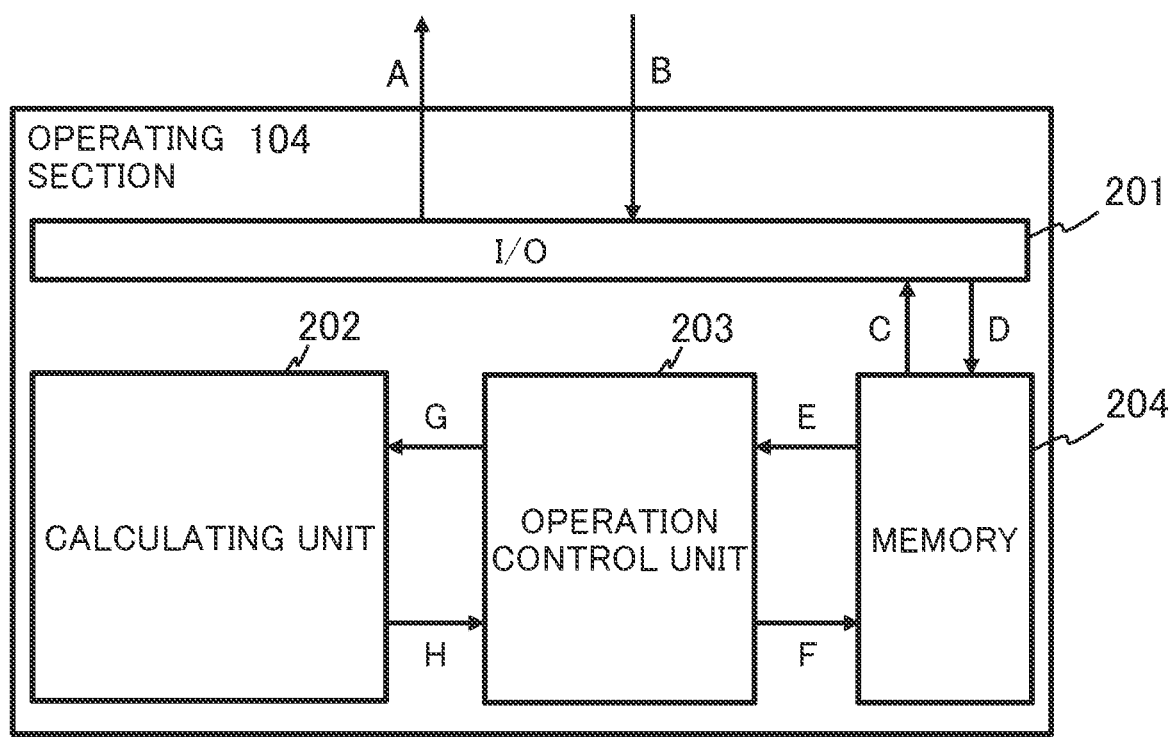
FIG. 3 is a configuration diagram showing an example of a configuration of an operating section.

An example of the configuration of the operating section 104 in the machine learning system 100 is shown in FIG. 3. The operating section 104 is comprised of a data interface unit 201, a memory 204, an operation control unit 203, and a calculating unit 202. The data interface unit 201 performs data communication between the learning section 103 and the memory 204. The memory 204 performs data communication between the data interface unit 201 and the operation control unit 203. The operation control unit 203 performs data communication between the memory 204 and the calculating unit 202. The calculating unit 202 performs data communication with the operation control unit 203. Arrows described in FIG. 3 indicate the flow of data and commands. The details of the data and commands corresponding to the arrows will be described later.

Figure 4:
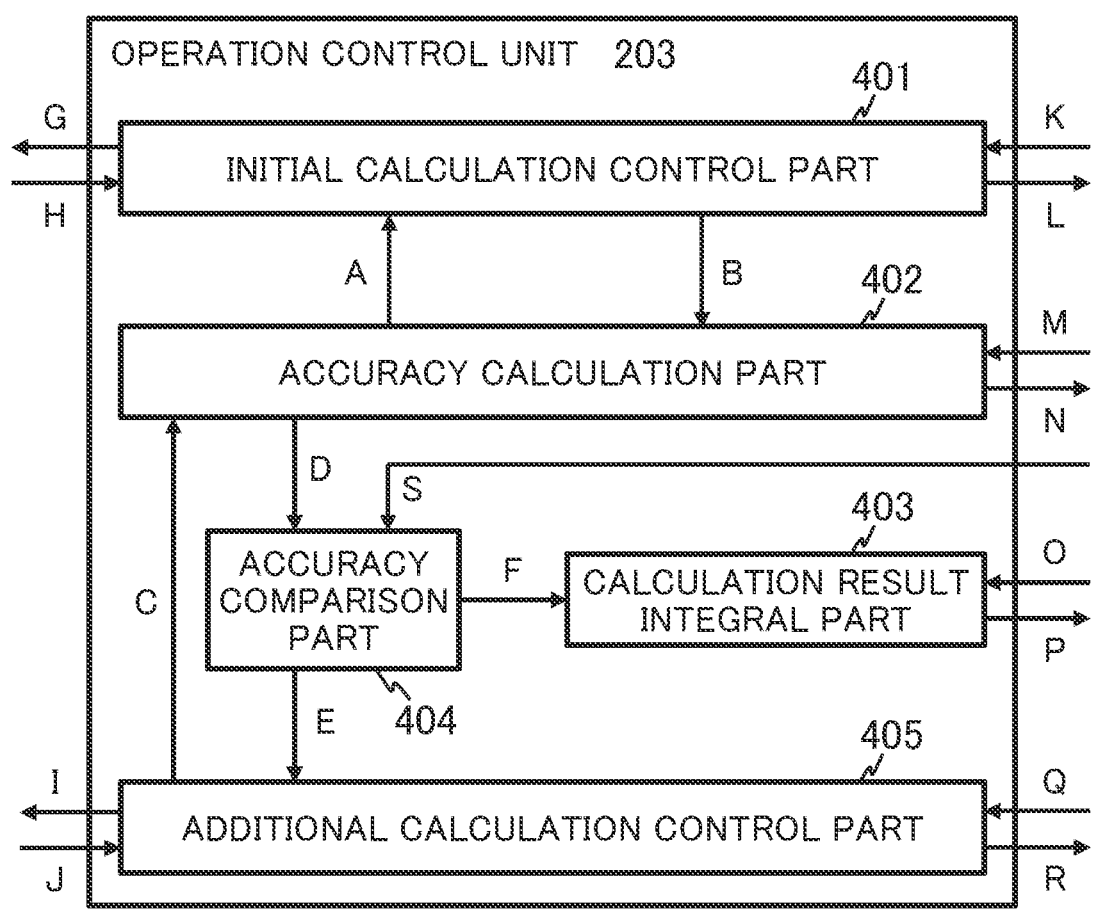
FIG. 4 is a configuration diagram showing an example of a configuration of an operation control unit.

An example of the configuration of the operation control unit 203 in the operating section 104 is shown in FIG. 4. The operation control unit 203 is comprised of an initial calculation control part 401, an accuracy calculation part 402, an accuracy comparison part 404, a calculation result integral part 403, and an additional calculation control part 405. Arrows described in FIG. 4 indicate the flow of data and commands. G, H, I, and J of the arrows in FIG. 4 indicate data communication with the calculating unit 202 shown in FIG. 3. K, L, M, N, O, P, Q, R, and S indicate data communication with the memory 204 shown in FIG. 3. The details of the data and commands corresponding to the arrows will be described later.

Figure 5:
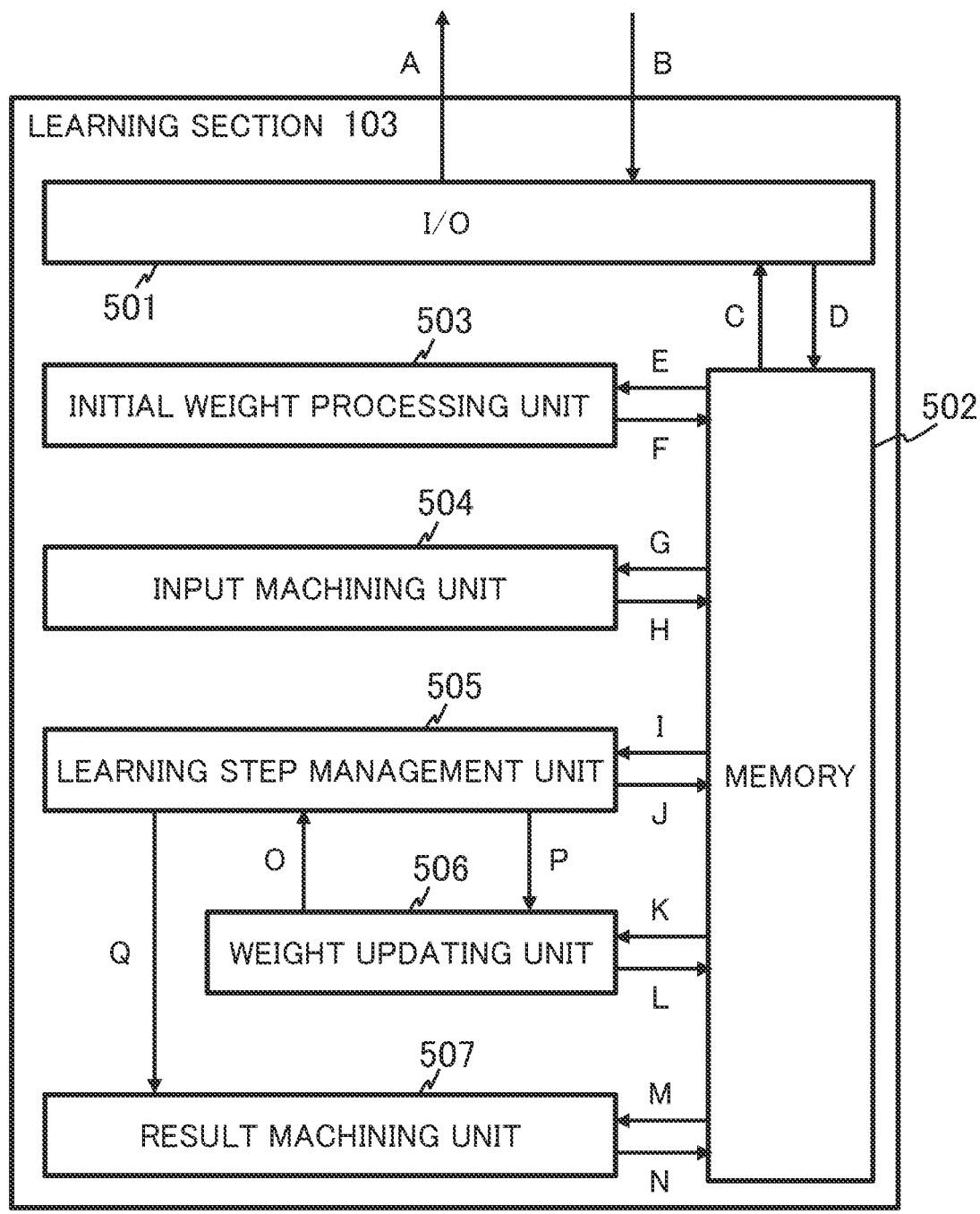
FIG. 5 is a configuration diagram showing an example of a configuration of a learning section.

An example of the configuration of the learning section 103 in the machine learning system is shown in FIG. 5. The learning section 103 is comprised of a data interface unit 501, a memory 502, an initial weight processing unit 503, an input machining unit 504, a learning step management unit 505, a weight updating unit 506, and a result machining unit 507. The learning section 103 is comprised of a general computer including a CPU serving as a processing unit, a memory, and an interface. The CPU executes an initial weight processing program, an input machining program, a learning step management program, a weight updating program, and a result machining program stored in the memory serving as a main storage device to realize the respective functions shown in FIG. 5. Incidentally, the memory storing each program therein may be the same memory as the memory 502 shown in FIG. 5 or may be configured by a different memory.

Arrows described in FIG. 5 indicate the flow of data and commands. The arrows A and B respectively indicate data communication between the data interface unit 501 and the host system, user, environment, storage, memory 102 and operating section 104 described in FIGS. 1 and 2.

Figure 6:
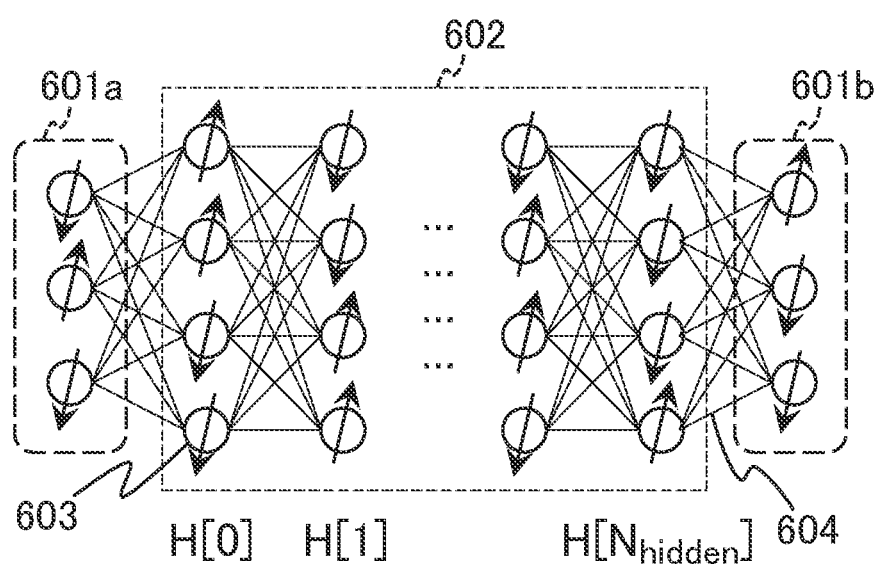
FIG. 6 is an explanatory diagram showing an example of a configuration of a Boltzmann machine.

An example of the Boltzmann machine used in the learner of the machine learning system 100 is shown in FIG. 6.

The Boltzmann machine is comprised of a visible spin 601 and a hidden spin 602. Each spin has a direction and can take two types (two values) of upward and downward directions. The visible spins are divided into two in order to input two types of spins different in meaning. For example, in the case of such learning with teacher as typified by image recognition/classification, the visible spin 601a becomes image data targeted for learning, and the visible spin 601b becomes information related to the classification of the image data input to the visible spin 601a (e.g., whether it is a cat or a dog).

Further, in the case of enhancement learning, the visible spin 601a corresponds to a state in which action is replied from the environment to Agent, and the visible spin 601b corresponds to the action of replying from Agent to the environment (e.g., whether to turn to the right or left).

The hidden spin is comprised of one or more layers (a row of spins such as H[0] in the drawing). When the hidden spin is one layer, it is called a limited Boltzmann machine. When the hidden spin is two or more layers, it is called a deep Boltzmann machine. In the example in FIG. 6, spins 603 belonging to adjacent layers are linked therebetween in all-to-all form, but the way of linking is not limited to this example, and they may be partly connected. The strength of linking is called a weight 604 and expressed by a numerical value. The value of the weight is updated by learning.

An example of parameters set upon initial setting prior to the learning is shown in FIG. 7.

The parameters are transmitted from the host system or user 101 described in FIG. 1 to the learning section 103 (arrow B in FIG. 1) before learning execution. Alternatively, with the command (arrow B in FIG. 1) transmitted from the host system or user 101 to the learning section 103 as a trigger, the learning section 103 acquires parameters from the environment, storage or memory 102 (arrow D in FIG. 1).

In another example, as shown in FIG. 2, before learning execution, the host system or user 101 reads out parameters from the environment, storage or memory 102 (arrow C in FIG. 2). Thereafter, the host system or user 101 transmits parameters to the learning section 103 (arrow B in FIG. 2). Some of the parameters transmitted to the learning section 103 in this manner are stored in the memory 502 in the learning section 103 described in FIG. 5 via the data interface unit 501 (arrows B and D shown in FIG. 5). The remainder thereof is transmitted from the learning section 103 to the operating section 104 (arrows F in FIGS. 1 and 2).

The remaining parameters transmitted to the operating section 104 are stored via the data interface unit 201 in the memory 204 in the operating section 104 described in FIG. 3 (arrows B and D in FIG. 3).

FIG. 7A shows an example of the parameters to be stored in the learning section 103. There is shown an example of a learning coefficient, the number of units (spins), the number of layers, an optimization method, the maximum value of a learning step, and a learning completion condition sequentially from above in a table.

FIG. 7B shows an example of parameters to be stored in the operating section 104. There is shown an example of a required accuracy, the number of times of initial calculation, the number of times of additional calculation, and the maximum number of times of calculation sequentially from above in a table.

Figure 8:
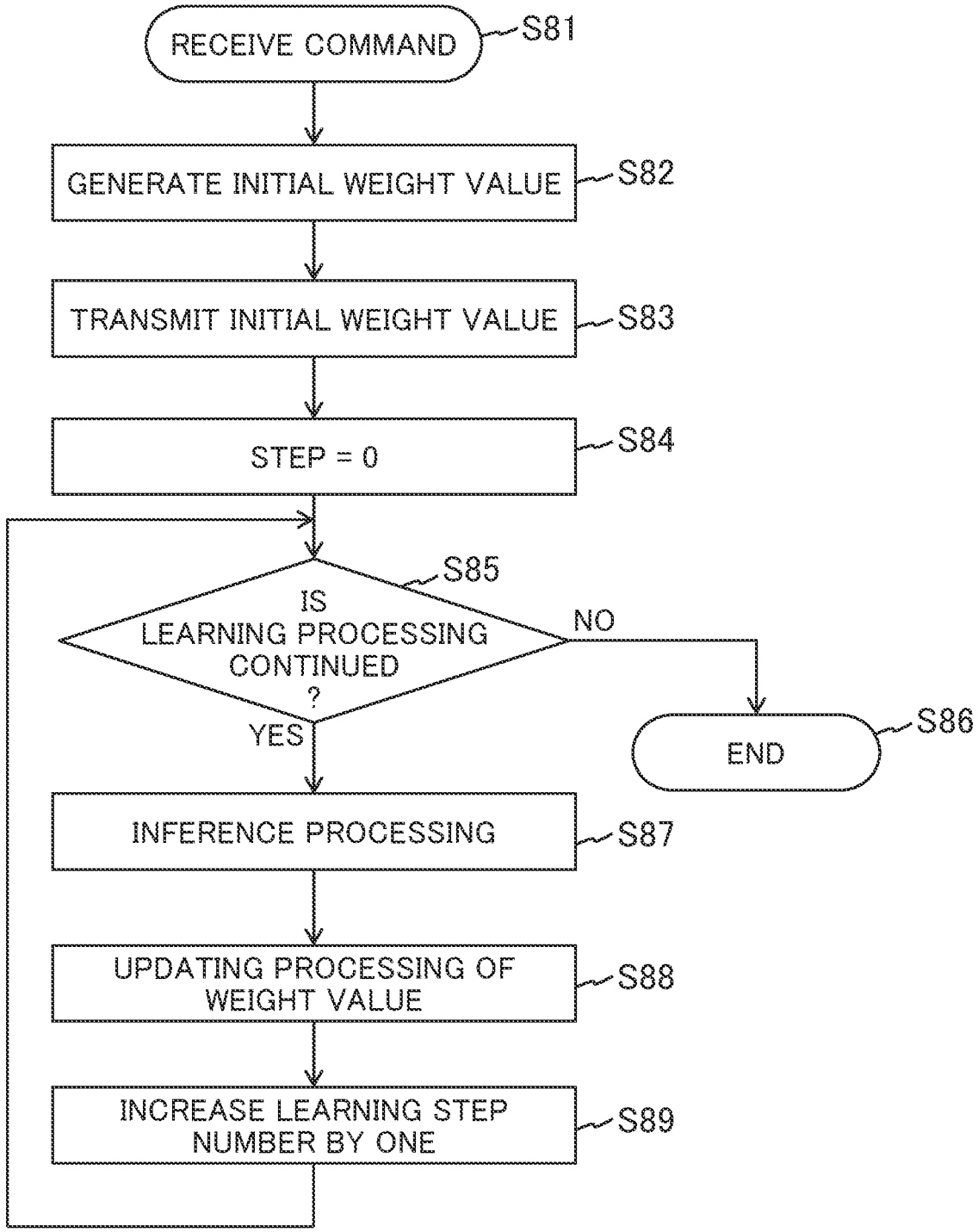
FIG. 8 is a flowchart showing an example of learning overall processing to be executed by the learning section.

An example of an operation flowchart of the learning section 103 is shown in FIG. 8.

First, in Step S81, the learning section 103 receives a learning start command from the host system or user 101 (arrows B in FIGS. 1 and 2). In Step S82, with the reception of the learning command as a trigger, the initial weight processing unit 503 in the learning section 103 reads a parameter (e.g., initial setting 1 in FIG. 7A) from the memory 502 in the learning section 103 (arrow E in FIG. 5) to generate an initial weight value. The generated initial weight value is stored in the memory 502 (arrow F in FIG. 5). The term initial weight value means an initial value of the weight value of the Boltzmann machine shown in FIG. 6, for example.

Next, in Step S83, the initial weight value stored in the memory 502 is transmitted to the operating section 104 via the data interface unit 501 in the learning section 103 (arrows C and A in FIG. 5). The initial weight value transmitted to the operating section 104 is stored in the memory 204 in the operating section 104 via the data interface unit 201 in the operating section 104 (arrows B and D in FIG. 3).

Next, in Step S84, the learning step management unit 505 inside the learning section 103 initializes the value of the learning step to 0.

It is determined in Step S85 whether learning processing is continued. When the learning processing is not continued (NO in FIG. 8), the learning is finished (S86). For example, in the case where data targeted for the learning processing is image data and the image data includes an image of a dog or a cat, a determination as to either the dog or the cat is finished when it can be performed with a constant accuracy.

When the learning processing is continued (YES in FIG. 8), the learning section 103 proceeds to the next Step S87. A criterion of whether or not the learning processing is continued is set at the initial setting before the learning. As one example, as shown in FIG. 7A, this criterion is made depending on whether the maximum value of the learning step is reached, whether the learning completion condition is satisfied, etc. The present value of the learning step is managed by the learning step management unit 505 inside the learning section 103.

Inference processing is performed in Step S87. The inference processing relative to the data transmitted from the host system 101, the environment, the storage or the memory 102 (memories 102 in FIGS. 1 and 2 or memory 502 inside the learning section in FIG. 5) to the learning section 103 is executed. The details of the inference processing will be described later.

In Step S88, the learning section 103 executes updating processing of the weight value. The details of Step S88 will be described later.

In Step S89, the learning step management unit 505 inside the learning section 103 increases the value of the learning step by one. Thereafter, the operation thereof returns to Step S85. In the above example, Steps S85 to S89 are called a learning step (corresponding to one step). The operation of the learning section 103 is comprised of repetition of the learning step.

Figure 9:
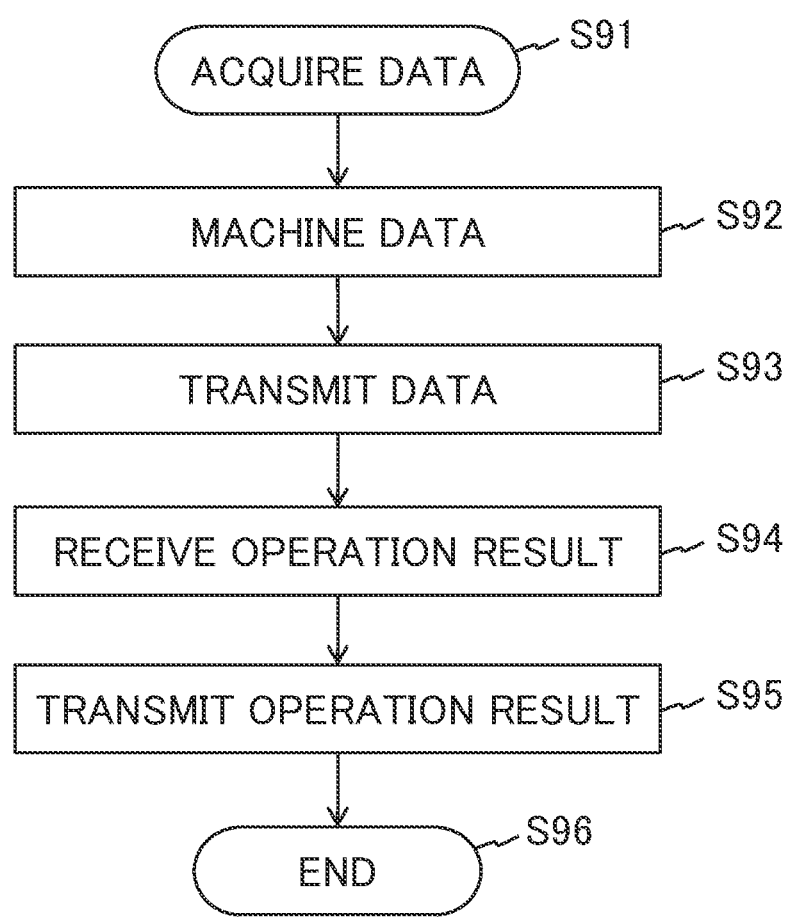
FIG. 9 is a flowchart showing an example of inference processing to be executed by the learning section.

An example of an operation flowchart of the inference processing (S87) to be executed by the learning section 103 is shown in FIG. 9.

In Step S91, the learning section 103 acquires data targeted for inference from the host system 101, the environment, the storage or the memory 102 (the memories 102 in FIGS. 1 and 2 or the memory 502 inside the learning section in FIG. 5). Where to acquire data differs depending on the type of machine learning or a learning process. For example, in the case of learning with a teacher, data is acquired from the storage or the memory 102 in a unit (e.g., minibatch size) set by a user or the like as indicated by the arrow D in FIG. 1. Alternatively, as indicated by the arrow B in FIG. 2, data is acquired from the storage or the memory 102 via the host system 101. Further, in the case of the enhancement learning, data may be acquired from the environment (via the host system) as indicated by the arrow D in FIG. 1 and the arrow B in FIG. 2. There is also a case where the data inferred in the past is acquired from the memory 502 inside the learning section in the unit (e.g., minibatch size) set by the user or the like (the memory 502 inside the learning section corresponds to a replay memory).

In Step S92, the input machining unit 504 inside the learning section machines the data acquired in Step S91. An example of the data machining is shown in FIGS. 10 and 11.

FIG. 10 shows an example where image data is machined. In the present example, assume that for simplification, the image data is blackened and whitened, and integer values from 0 to 127 are assigned to respective pixels. As shown in FIG. 6, when the inference processing is executing by the Boltzmann machine, data to be input is required to be represented as a spin arrangement of a visible spin 1 (visible spin 601a), i.e., an upward or downward arrangement. It is therefore necessary to convert the data into any binary array. In the example shown in FIG. 10, the data is converted into an array of two values (0 or 1) in accordance with a conversion rule in which an integer of each pixel value is determined in advance. For example, a pixel 1001 is converted into binary data 1002.

Figure 11:
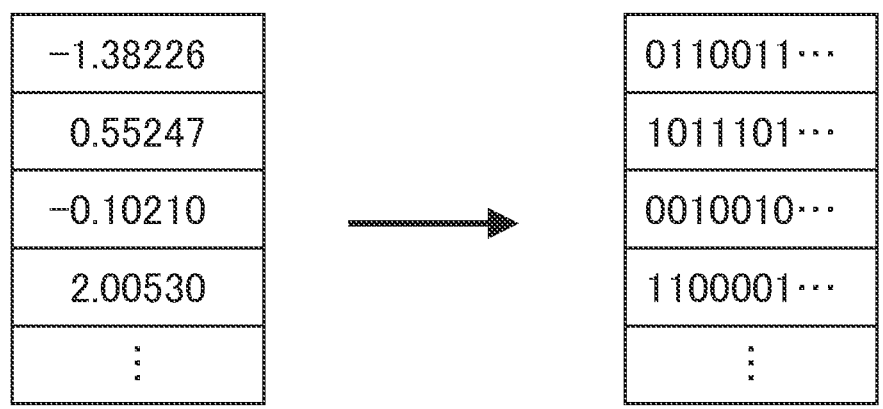
FIG. 11 is an explanatory diagram showing an example of conversion of continuous value data to be input to the operating section.

FIG. 11 shows an example where data comprised of a plurality of continuous values is machined. For example, in the case where classical control (mechanical problem) is treated, the position of a point of an object and its acceleration are represented as continuous values. As shown in FIG. 11, they are converted into the array of two values (0 or 1) in accordance with the predetermined conversion rule, which is input to the learner (Boltzmann machine) as the spin array of the visible spin 1 (visible spin 601a).

In Step S93, the learning section 103 transmits the machined data to the operating section 104. The specific flow of data will be described using FIG. 5. First, the input machining unit 504 transmits the machined data to the memory 502 (arrow H in FIG. 5). Next, the data interface unit 501 reads the machined data from the memory 502 (arrow C in FIG. 5) and transmits the same to the operating section 104 (arrow A in FIG. 5 and arrows F in FIGS. 1 and 2).

In Step S94, the learning section 103 receives an operation result from the operating section 104. The operation result output from the operating section 104 is stored in the memory 502 inside the learning section via the data interface unit 501 inside the learning section (arrows B and D in FIG. 5). The details of the operation processing to be executed by the operating section 104 will be described later.

In Step S95, the learning section 103 machines the operation result received from the operating section 104 as needed and transmits the same to the host system 101 or the environment 102. The machining of the operation result is, for example, processing for extracting a classification number highest in output value from obtained output values (operation result) for each classification in the case of the learning with the teacher, and is, for example, processing for selecting one action with respect to evaluation values (received from the operating section 104 as a Q value, an action selection probability, and an operation result) for each action in the case of the enforcement learning.

The operation result stored in the memory 502 inside the learning section is read and machined by the result machining unit 507 shown in FIG. 5 and stored in the memory 502 inside the learning section again (arrows M and N in FIG. 5). Further, the operation result machined as needed is transmitted to the host system 101 and the environment 102 via the memory 502 by the data interface unit 501 (arrows N, C, and A in FIG. 5, arrows A and C in FIG. 1, and arrows A and D in FIG. 2). The operation of the inference processing to be executed by the learning section 103 is finished above (S96).

Figure 12:
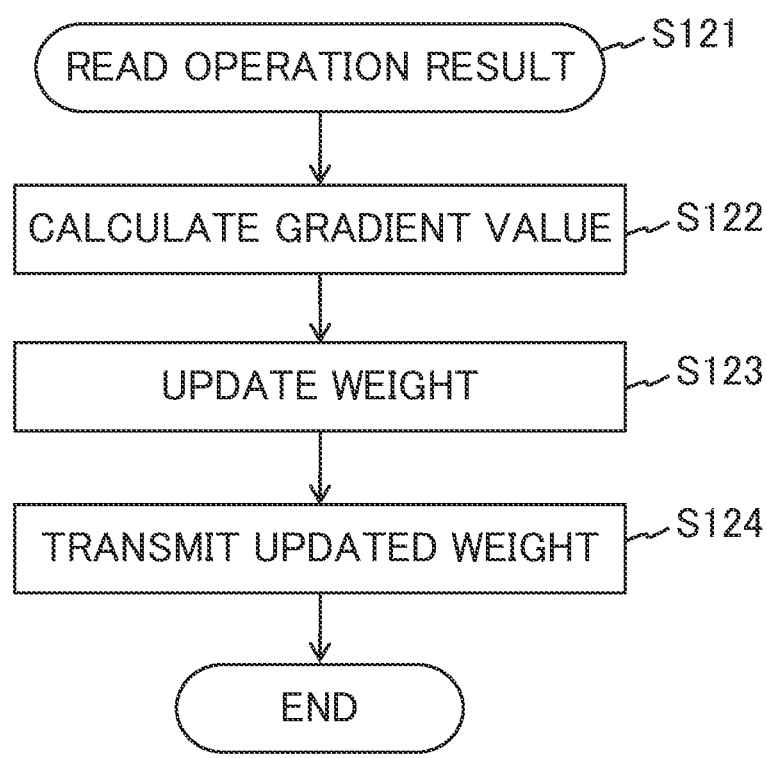
FIG. 12 is a flowchart showing an example of weight updating processing to be executed by the learning section.

An example of an operation flowchart of the updating processing of the weight value to be executed by the learning section 103 in Step S88 of FIG. 8 is shown in FIG. 12.

In Step S121, the weight updating unit 506 inside the learning section reads the operation result or machined operation result stored in the memory 502 inside the learning section (arrow K in FIG. 5).

In Step S122, the weight updating unit 506 inside the learning section calculates a gradient value, based on the read operation result or machined operation result. Here, the term gradient value is a value of a gradient when an error between an evaluation value and a true value (or a value equivalent to the true value) at the learning is partially differentiated by the weight of the learner (Boltzmann machine) shown in FIG. 6. The term error is, for example, an error between the probability of data belonging to each classification and a correct answer label (e.g., the value of a correct answer classification number being 1 and the remainder being 0). Also, in the case of the enforcement learning, there are mentioned, for example, an error between a Q value and an estimated Q value, etc. Further, in the case where minibatch learning is performed, a gradient value of the average value of the above-described error relative to a plurality of data is calculated. The calculated gradient value is stored in the memory 502 inside the learning section (arrow L in FIG. 5).

In Step S123, the weight updating unit 506 inside the learning section reads the gradient value calculated in Step S122 from the memory 502 inside the learning section (arrow K in FIG. 5) and calculates the amount of updating of the Weight of the learner (Boltzmann machine) on the basis of the read gradient value. The updating amount of the Weight is the amount of the value of a weight updated (increased/decreased) in this learning step. For example, when the value of the current weight is 0.55, and the updating amount of the weight is 0.03, the updated weight becomes 0.55+0.03=0.58. The updating amount of the weight is calculated on the basis of the learning coefficient and optimization method shown in FIG. 7A in addition to the calculated gradient value.

The calculated updating amount of weight is stored in the memory 502 inside the learning section (arrow L in FIG. 5). Next, the weight updating unit 506 transmits a weight value read command to the data interface unit 501 via the memory 502 (arrows L and C in FIG. 5). The data interface unit 501 transmits the weight value read command to the operating section 104 (arrow A in FIG. 5 and arrow B in FIG. 3).

The data interface unit 201 inside the operating section subjected to the command transmits the weight value stored in the memory 204 inside the operating section to the learning section 103 (arrows C and A in FIG. 3 and arrow B in FIG. 5). The data interface unit 501 inside the learning section which has received the weight value therein stores the received weight value in the memory 502 inside the learning section (arrow D in FIG. 5).

The weight updating unit 506 reads the received weight value and the previously-calculated updating amount of weight from the memory 502 and adds them together to update the weight value (arrow K in FIG. 5). The updated weight value is stored again in the memory 502 inside the learning section (arrow L in FIG. 5).

In Step S124, the weight updating unit 506 inside the learning section notifies the data interface unit 501 inside the learning section of the completion of Step S123 by using a flag or the like inside the memory 502. On receipt of the notification of its completion, the data interface unit 501 transmits the updated weight stored in the memory 502 to the operating section 104 (arrows C and A in FIG. 5). After the transmission of the updated weight to the operating section 104, the weight updating unit 506 inside the learning section notifies the learning step management unit 505 of the completion of its weight transmission (arrow O in FIG. 5), whereby the operation of the updating processing of the weigh value is finished.

Figure 13:
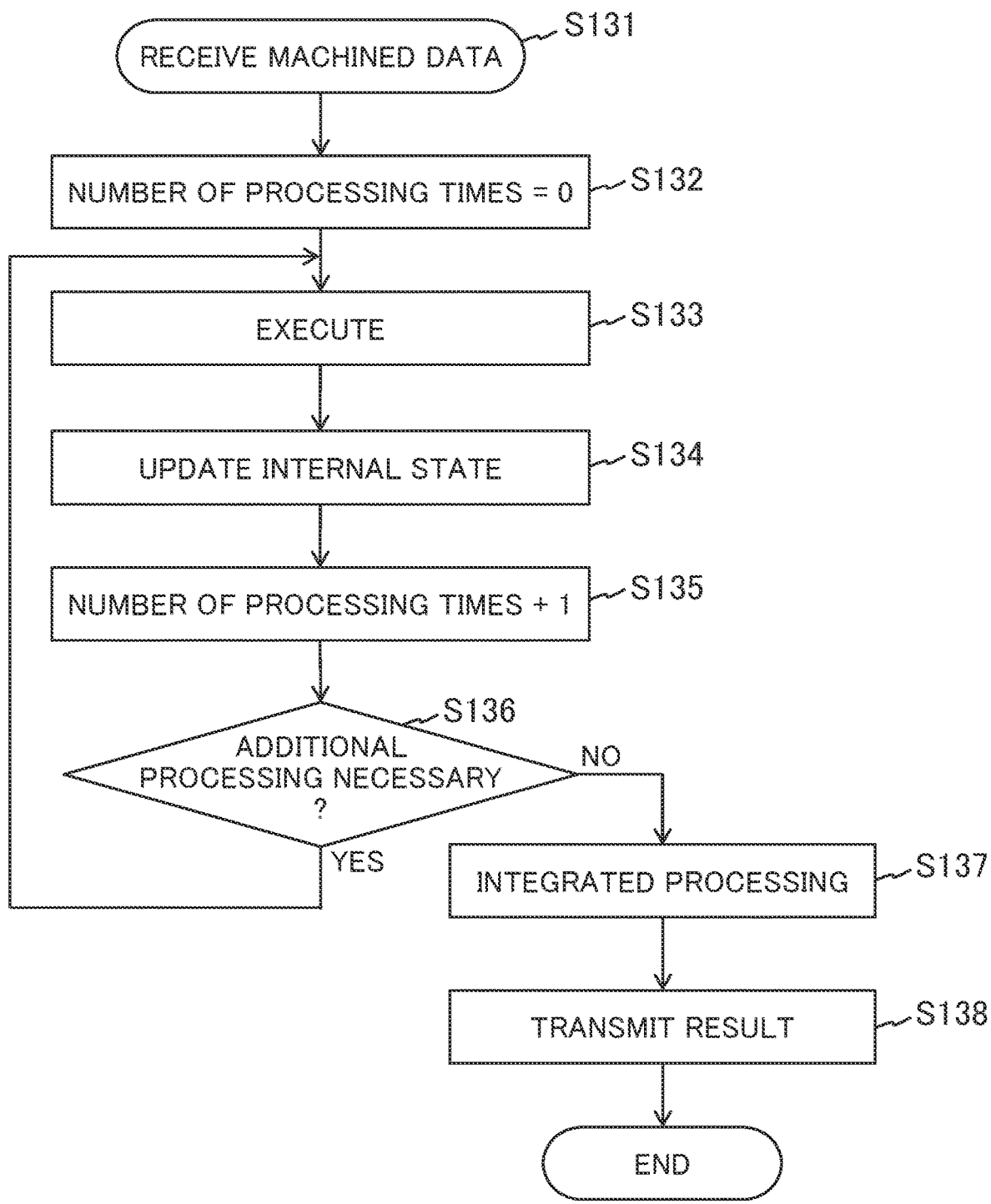
FIG. 13 is a flowchart showing an example of overall processing of operation to be executed by the operating section.

An example of an operation flowchart of the operation processing to be executed by the operating section 104 is shown in FIG. 13.

In Step S131, the data interface unit 201 inside the operating section 104 receives the machined data transmitted from the learning section 103 as data targeted for learning and stores the same in the memory 204 inside the operating section (arrows B and D in FIG. 3). This corresponds to the machined data transmitted from the learning section 103 to the operating section 104 in the processing (S93) in the above-described inference processing.

In Step S132, the initial calculation control part 401 inside the operation control unit 203 resets the number of times of processing (=Noperation) executed in the operation processing in this time to 0. Further, the initial calculation control part 401 initializes an internal state of the learner and stores the initialized internal state in the memory 204 in the operating section 104 (arrow L in FIG. 4). An example of the learner is the Boltzmann machine shown in FIG. 6. For example, the internal state of the learner corresponds to the direction of each hidden spin 602 or its upward probability. In the initialization, the internal state of the learner is reset at random or in accordance with a set initialization algorithm.

In Step S133, the initial calculation control part 401 or the additional calculation control part 405 inside the operation control unit 203 reads the machined data, the weight value of the learning section, and the internal state of the learner from the memory 204 in the operating section 104 (arrow K or Q in FIG. 4). Thereafter, the initial calculation control part 401 or the additional calculation control part 405 transmits the read machined data, weight value and internal state to the calculating unit 202 (arrow G or I in FIG. 4).

The calculating unit 202 executes calculation processing on the basis of the machined data, the weight value and the internal state of the learner which have been transmitted thereto. In the calculation processing, the calculating unit 202 calculates, for example, the direction or upward probability of each hidden spin 602 of the Boltzmann machine shown in FIG. 6. The term internal state refers to the direction and upward probability of the spin where the learner is configured by the Boltzmann machine. As a method of calculating the direction of each hidden spin 602, there is known an annealing method. In the annealing method, the temperature is gradually cooled from a sufficient high temperature to reach a predetermined constant temperature while relaxing the direction of each hidden spin 602. In this case, assume that the machined data (binarized) is set as the direction of the visible spin (visible spin 601*a* or visible spin 601*b*), and its direction is fixed. By one calculation processing, the direction of each hidden spin 602 is generally obtained for one set.

In the calculation processing, the energy of the whole system is also calculated from the directions of these visible spins (visible spin 601*a* and visible spin 601*b*) and each hidden spin 602 in addition to the direction of each hidden spin 602. The direction of each hidden spin 602 and the value of the energy which have been calculated become a result of the calculation processing indicative of the internal state.

Further, in the calculation processing as described above, the directions of the respective hidden spins 602 are calculated for each set, and the calculation of an expected value is performed from their results, whereby the upward probability of each hidden spin 602 may be determined. However, the upward probability can also be directly calculated by using mean-field approximation or the like. In the mean-field approximation, the calculation first starts with the initialized value of upward probability, and the value of the upward probability is converged to a true value for each calculation processing. Therefore, the calculation processing is executed using the upward probability of each hidden spin 602, machined data and weight value obtained as a result of the previous calculation processing to calculate the new upward probability of each hidden spin 602.

In the calculation processing as with the case of the annealing method, as the need arises, in addition to the upward probability of each hidden spin 602, the energy of the whole system is also calculated from the upward probabilities of these visible spins (visible spin 601*a* and visible spin 601*b*) and each hidden spin 602. The upward probability of each hidden spin 602 and the value of the energy which have been calculated become a result of the calculation processing.

The result of the calculation processing executed in the calculating unit 202 is stored in the memory 204 in the operating section 104 via the initial calculation control part 401 or the additional calculation control part 405 (arrows H and L or J and R in FIG. 4). When the calculation processing is executed for the first time in this learning, the initial weight value sent from the learning section 103 to the operating section 104 in the processing of Step S82 in FIG. 8 is stored in the memory 204, and the initial weight value is used for the calculation processing.

When the updating processing (S123) of the weight value is performed before the calculation processing, the updated weight value transmitted from the learning section 103 to the operating section 104 in Step S124 is used for the calculation processing. Further, in the enhancement learning, there is a case where when calculating the estimated Q value, the calculation processing is executed using a weight value in a learning step immediately before the present without using the current latest weight value. Whether how long ago the weight value in the learning step is used is set at the initial setting before the learning as a part of the parameters shown in FIG. 7.

In Step S134, the initial calculation control part 401 or the additional calculation control part 405 reads the result of the calculation processing executed in Step S133, the internal state of the learner, and the weight value of the learner as needed from the memory 204 in the operating section 104 and transmits the same to the calculating unit 202 (arrows K and G or Q and I in FIG. 4).

The calculating unit 202 updates the internal state on the basis of those and stores the updated internal state in the memory 204 in the operating section 104 again via the initial calculation control part 401 or the additional calculation control part 405. The updating of the internal state corresponds to, for example, the addition of the result of calculation processing in this time to the result up to the previous time, the calculation of an average value, a distribution value or the like as needed where the internal state corresponds to the direction of each hidden spin 602. Further, the updating of the internal state corresponds to the addition of the result of the calculation processing in this time to the result up to the previous time or the estimation of the true value or the like from those where the internal state corresponds to the upward probability of each hidden spin 602.

In Step S135, the initial calculation control part 401 increases the number of times of processing (Noperation) by 1.

In Step S136, the operation control unit 203 determines whether Step S133 is executed additionally. When it is determined that Step S133 is executed additionally (YES in FIG. 13), the processing of Step S133 is executed again. When it is determined that the execution by addition is unnecessary (NO in FIG. 13), the next Step S137 is executed. The details of the operation of Step S136 will be described later.

In Step S137, the calculation result integral part 403 inside the operation control unit 203 integrally processes the results (the direction and upward probability of each hidden spin 602 being the internal state) of the calculation processing repeated several times up to now to calculate an evaluation value. The integral processing will be specifically described. For example, the calculation result integral part 403 reads the results of the calculation processing stored in the memory 204 by the number of repetition times of the calculation processing, calculates the average value of those, and stores the same in the memory 204 again (arrows O and P in FIG. 4). Alternatively, the latest result of calculation processing stored in the memory 204 may be defined as an integrated calculation result.

In Step S138, the data interface unit 201 inside the operating section reads the integrated result stored in the memory 204 and transmits the same to the learning section 103 (arrows C and A in FIG. 3). After its transmission, the operation of the operation processing is completed. As will be described in detail later, the learning section 103 utilizes the integrated result as the obtained output value for each classification in the case of the learning with the teacher, for example, and utilizes it as the evaluation value (Q value or action selection probability) for each action in the case of the enhancement learning.

Figure 14:
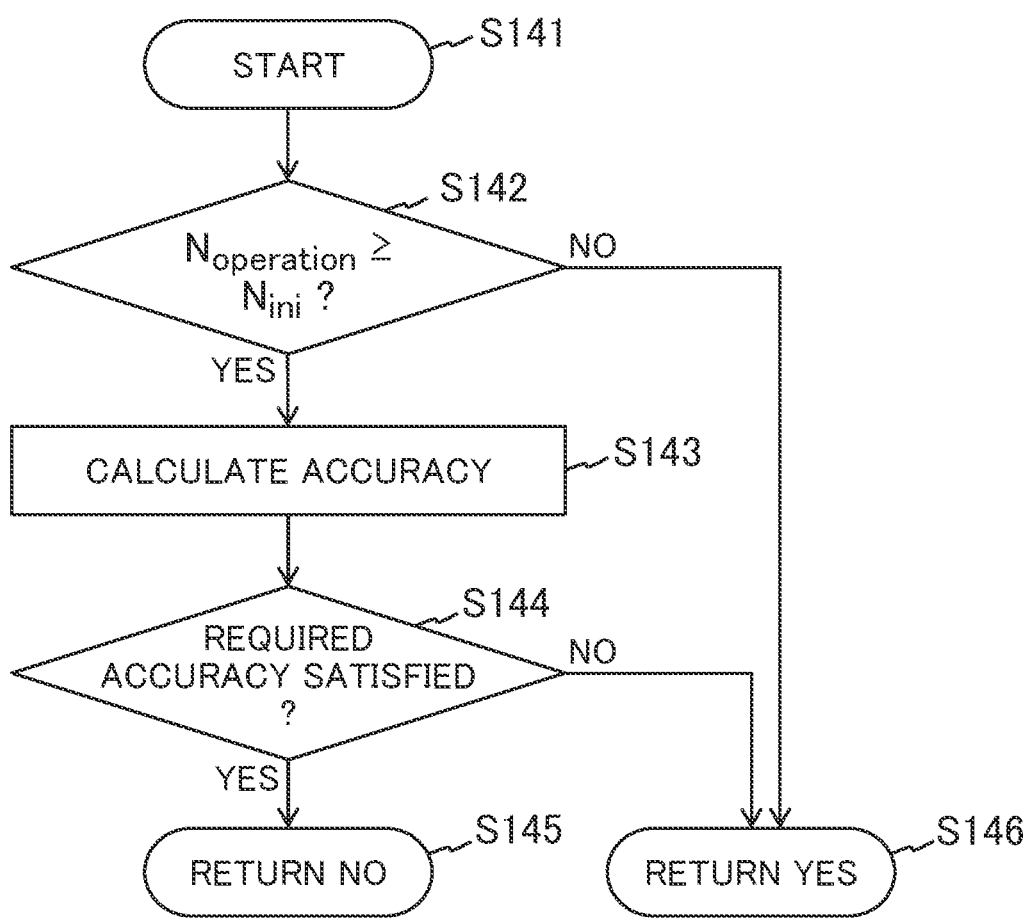
FIG. 14 is a flowchart showing an example of operation addition execution determining processing to be executed by the operating section.

An example of an operation flowchart of Step S136 to be executed by the operation control unit 203 is shown in FIG. 14.

In Step S142, the initial calculation control part 401 reads Nini from the memory 204 inside the operating section (arrow K in FIG. 4). Nini corresponds to the number of times of initial calculations shown in FIG. 7B. It is one of the parameters set at the initial setting before the learning and stored in the memory 204 inside the operating section. The initial calculation control part 401 compares the number of times Noperation of Step S133 with Nini. When the Noperation is greater than or equal to Nini (YES in FIG. 14), the initial calculation control part 401 proceeds to the next Step S143. If not so, the initial calculation control part 401 proceeds to Step S146 where YES is returned ("RETURN YES"). Returning YES corresponds to YES of Step S136 in the operation flowchart of the operation processing in FIG. 13, and the processing from Step S133 is executed once again. In this case, since the Noperation is less than Nini, the processing is executed on a leading basis by the initial calculation control part 401.

In Step S143, the accuracy calculation part 402 reads the result of the calculation processing executed so far in the term "Execute" of Step S133 in the operation flowchart of the operation processing shown in FIG. 13 from the memory 204 (arrow M in FIG. 4). The accuracy calculation part 402 calculates an accuracy from the read result and transmits the calculated accuracy to the accuracy comparison part 404 (arrow D in FIG. 4) to determine the accuracy.

As described above, the leaner using the Boltzmann machine of FIG. 6 has the internal state indicative of the spins, the average value thereof, etc. and the weight between the spins. The weight between the spins is subjected to the update processing in the learning section 103, and the internal state indicative of the spins, their average value, etc. is calculated and updated in the operating section 104.

An example of a method of calculating the accuracy from the result of the calculation processing will be described using FIG. 15.

Figure 15:
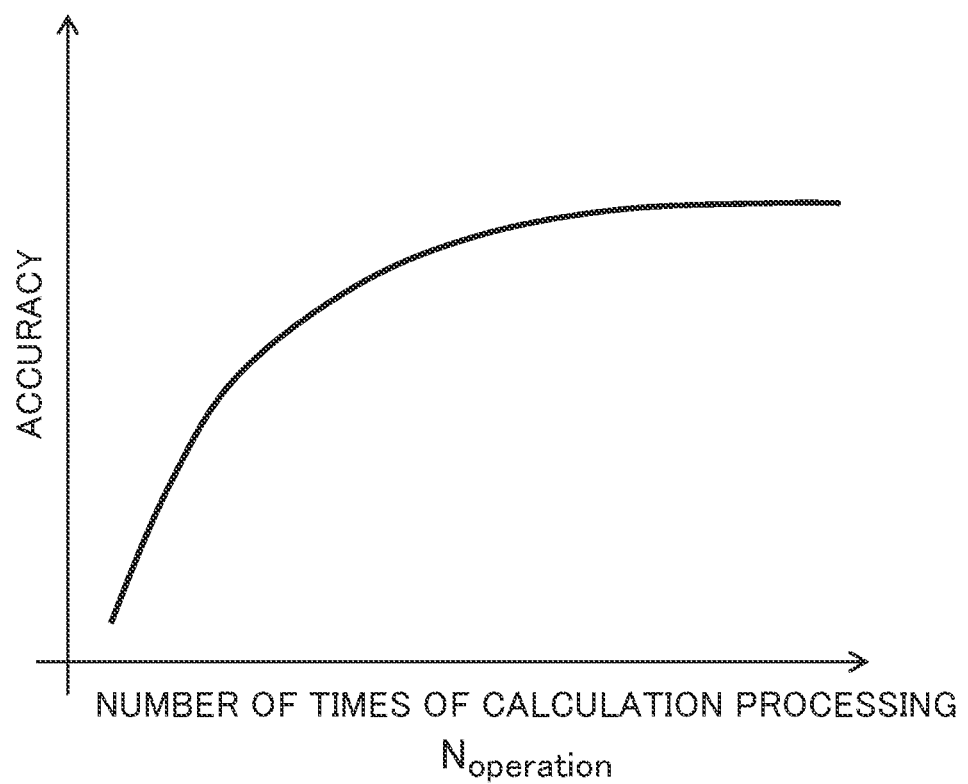
FIG. 15 is a graph showing an example of a relationship between the number of times of repetition of operation and the accuracy of the operation.

FIG. 15 is a graph showing an example of a relationship between the number of times of calculation processing (Noperation) and the accuracy. In the present example, the accuracy also increases as the number of times of calculation processing (Noperation) increases. Such a relationship is established because it is thought that, for example, while the value of the result of calculation processing follows the same probability distribution, the value varies probabilistically for each trial, and that the value of the result is converted to a certain value for each calculation processing. In the former case, an error in the average value of the values of the results of calculation processing tried plural times, or the like can be determined as a calculation accuracy by using the maximum likelihood estimation method or the like assuming a probability distribution of the varied value of result. In the latter case, an error between a true value at a convergence destination and the value of the current result can be determined as a calculation accuracy by extrapolating the value (variation in the value) of the result for each calculation processing.

In Step S144, the accuracy comparison part 404 having received the accuracy calculated in the accuracy calculation part 402 reads the required accuracy shown in FIG. 7B from the memory 204 inside the operating section (arrow S in FIG. 4). As described above, the required accuracy is set at the initial setting before the learning and stored in the memory 204 inside the operating section. Next, the accuracy comparison part 404 compares the accuracy received from the accuracy calculation part 402 with the read required accuracy. As a result, if the received accuracy is higher than the required accuracy, the accuracy comparison part 404 proceeds to Step S145, where NO is returned ("RETURN NO"). Returning NO corresponds to NO of Step S136 in the operation flowchart of the operation processing in FIG. 13 and then Step S137 is executed.

Further, as a result of comparison, if the received accuracy is lower than the required accuracy, the accuracy comparison part 404 proceeds to Step S146 where YES is returned ("RETURN YES"). Returning YES corresponds to YES of Step S136 in the operation flowchart of the operation processing in FIG. 13, and the operation processing is executed once more from Step S133. In this case, since the Noperation is greater than or equal to Nini, the initial calculation is assumed to have been finished, and the processing from Step S133 is executed on a leading basis by the additional calculation control part 405. The additional calculation control part 405 reads the additional number of calculation times shown in FIG. 7B from the memory 204 (arrow Q in FIG. 4) to decide how many times the calculation processing is executed additionally.

An example in which the relationship between the number of times of the calculation processing (Noperation) and the accuracy changes according to the learning step will be described using FIGS. 16 and 17.

Figure 16:
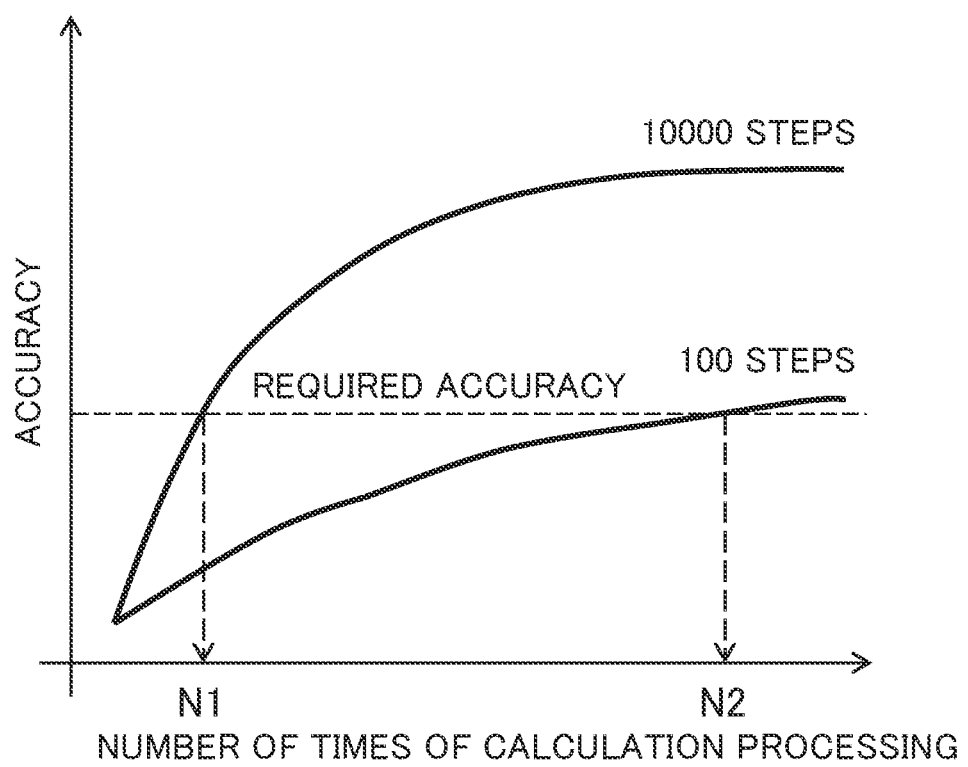
FIG. 16 is a graph showing an example of the difference in relationship between the number of times of repetition of operation and the accuracy of the operation at different learning step numbers.

FIG. 16 shows an example in which the relationship between the number of times of the calculation processing (Noperation) and the accuracy changes where the learning step is 100 steps ("100 steps" in FIG. 16) and the learning step is 10000 steps ("10000 steps" in FIG. 16). In order to satisfy the required accuracy indicated by a horizontal dotted line in FIG. 16, the number of times of calculation processing may be set to be greater than or equal to N2 where the learning step is 100 steps, and may be set to be greater than or equal to N1 where the learning step is 10000 steps.

In this example, N1<N2. That is, as the learning step increases (learning progresses), the accuracy is improved with a less number of times of calculation processing (Noperation). This corresponds to the fact that in the case where the value of the result of the calculation processing which is the above-described example varies probabilistically for each trial while the value thereof follows the same probability distribution, the dispersion of the probability distribution that the value of the result follows is reduced as the learning step increases.

When the dispersion is reduced, the error in the average value of the values of the results becomes small by the less number of times of calculation processing (Noperation). That is, the accuracy becomes high. Further, in the case where the value of the result is converged to a certain value for each calculation processing, it is equivalent to the case where as the learning step increases, its convergence speed is improved. If the convergence speed is improved, then a value close to the true value at the convergence destination is obtained by the less number of times of calculation processing (Noperation). That is, the accuracy becomes high.

FIG. 17 shows an example in which the relationship between the learning step for the number of times of updating the weight value or the like and the minimum value of the number of times of calculation processing that satisfies the required accuracy changes where the required accuracy is 0.95 ("required accuracy 0.95" in FIG. 17) and where the required accuracy is 0.97 ("required accuracy 0.97" in FIG. 17).

In either of both cases, the minimum value of the number of times of calculation processing that satisfies the required accuracy decreases as the learning step increases. This corresponds to the fact that as with the example shown in FIG. 16, the accuracy is improved by the less number of times of calculation processing. Further, the minimum value of the number of times of calculation processing that satisfies the required accuracy become large in the case of 0.97 high in the required accuracy where the two cases are compared in the same learning step. This corresponds to the fact that as shown in FIGS. 15 and 16, the accuracy also increases monotonously as the number of times of calculation processing is increased.

As described even in the above embodiment, if the host system is one capable of realizing its function, the host system may be software, hardware or their combination, or may be software or hardware cooperated (or integral) with the learning section 103 and the operating section 104. Also, the learning section 103 is not limited to the hardware either but may be mounted as software partly or in all, or may be software or hardware cooperated (or integral) with the operating section 104. Further, although the above embodiment has been described by taking the example in which the machine learning system is comprised of the host system, the learning section 103, and the operating section 104, the machine learning system may be configured as a single module allowed to have the functions of the host system, the learning section 103, and the operating section 104.

In the description of the above embodiment, there has been illustrated the machine learning system as the block diagrams divided into the upper system, the environment, the storage, the memory, the learning section, the operating section, etc. for each function. The machine learning system is not however limited to the above-described functional divisions, but may include a function of generalizing machine learning, a function of storing/supplying data used in the machine learning, a function of performing inference from data, and a function of updating the weight of the learning section. A mounting form may be mounted as a dedicated circuit like ASIC or mounted as programmable logic like FPGA. Also, the mounting form may be mounted to a built-in microcomputer or mounted as software operated on a CPU or a GPU. Alternatively, the mounting form may be mounted in above combination for each function.

Although the specific description has been made above with reference to the accompanying drawings, the preferred embodiment is not limited to the above description. It goes without saying that various changes are possible in the scope not departing from the gist of the embodiment.

Main effects obtained by the present embodiment described above are as follows:

In the machine learning, the number of times of product-sum operation necessary when updating the weight value of the learning section can be reduced by estimating the accuracy at the time of data inference for each progress degree of learning, and the learning time can be shortened more than so far.

Also, the shortening of the learning time enables a higher-speed and power-saving machine learning system to be constructed.

Further, the operating section is capable of, according to the increase in the number of times of updating the weight value, reducing the calculation processing for calculating the evaluation value and the number of repeat times of updating the internal state of the learner.

What is claimed is:

1. A machine learning system comprising:
 a first computer implementing a machine learning framework; and
 a second computer coupled to the first computer, the second computer implementing a Boltzmann machine comprised of a visible spin and a hidden spin,
 wherein the second computer stores operating a predetermined required accuracy, an internal state indicating a direction of each hidden spin, and a weight value of the Boltzmann machine,
 wherein the second computer is programmed to:
 execute calculation processing to update the stored internal state by using input data input to the machine learning system, the stored weight value, and the internal state,
 calculate an accuracy of the updated internal state,
 determine whether the calculated accuracy is greater than the predetermined required accuracy,
 upon determining the calculated accuracy is greater than the predetermined required accuracy, calculate an evaluation value by using the input data input to the machine learning system, the weight value, and the updated internal state which indicates the direction of each hidden spin, and transmit the evaluation value to the first computer, and wherein the first computer is programmed to update the weight value by using the evaluation value and notify the number of times of updating the weight value to the second computer.

2. The machine learning system according to claim 1, wherein the second computer is programmed to, upon determining the calculated accuracy is not greater than the predetermined required accuracy, update the internal state to repeat the calculation processing.

3. The machine learning system according to claim 2, wherein upon repeated execution, by the second computer of updating of the internal state, the calculated accuracy corresponds to a difference value between a state in which the internal state converges and the current internal state, or a dispersion value of the current internal state.

4. The machine learning system according to claim 1, wherein the second computer is programmed to, upon determining the accuracy of the internal state does not satisfy a threshold value of the required accuracy as the result of a comparison, execute the calculation processing and updating of the internal state before calculating the evaluation value.

5. The machine learning system according to claim 4, wherein before executing the comparison, the second computer is programmed to execute the calculation processing and the updating of the internal state by a number indicating a number of times of initial calculation processing, which is initially predetermined and stored.

6. The machine learning system according to claim 2, wherein the second computer is programmed to, upon determining a number of times of the calculation processing and updating of the internal state is greater than or equal to the maximum number of times of calculation processing regardless of the result of the comparison, calculate the evaluation value and transmit the evaluation value to the first computer.

7. The machine learning system according to claim 1, wherein the internal state has binary discrete values.

8. The machine learning system according to claim 1, wherein the internal state is comprised of discrete values of three or more values.

9. A learning method for a machine learning system having a first computer implementing a machine learning framework and a second computer coupled to the first computer, the second computer implementing a Boltzmann machine comprised of a visible spin and a hidden spin, comprising the steps of:

by the second computer:

storing a predetermined required accuracy, an internal state indicating a direction of each hidden spin, and a weight value of the Boltzmann machine;

executing calculation processing by using input data input to the machine learning system, the stored weight value and the internal state to thereby update the internal state;

calculating an accuracy of the updated internal state from a result of the calculation processing;

determining whether the calculated accuracy is greater than the predetermined required accuracy;

upon determining the calculated accuracy is greater than the predetermined required accuracy, calculating an evaluation value by using the input data input to the machine learning system, the weight value held in the memory, and the updated internal state, which indicates the direction of each hidden spin; and transmitting the evaluation value to the first computer; and causing the first computer to update the weight value by using the evaluation value and notifying the number of times of updating the weight value to the first computer.

\* \* \* \* \*